US012726504B2

(12) United States Patent
Richard

(10) Patent No.: US 12,726,504 B2
(45) Date of Patent: Sep. 1, 2026

(54) GENERATIVE SYSTEMS AND METHODS FOR ADAPTIVE VULNERABILITY MANAGEMENT

(71) Applicant: T-Mobile USA, Inc., Bellevue, WA (US)

(72) Inventor: James Cooper Richard, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 128 days.

(21) Appl. No.: 18/908,753

(22) Filed: Oct. 7, 2024

(65) Prior Publication Data

US 2026/0100964 A1 Apr. 9, 2026

(51) Int. Cl.
*H04L 9/40* (2022.01)

(52) U.S. Cl.
CPC ................................ *H04L 63/1433* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 7,260,844 | B1 | 8/2007 | Tidwell et al. |
| 7,451,488 | B2 | 11/2008 | Cooper et al. |
| 7,698,275 | B2 | 4/2010 | Obrien et al. |
| 7,712,138 | B2 | 5/2010 | Zobel et al. |
| 7,743,421 | B2 | 6/2010 | Cosquer et al. |
| 8,095,984 | B2 | 1/2012 | Mcfarlane et al. |
| 8,201,257 | B1 | 6/2012 | Andres et al. |
| 8,495,745 | B1 | 7/2013 | Schrecker et al. |
| 8,549,650 | B2 | 10/2013 | Hanson |
| 8,595,845 | B2 | 11/2013 | Basavapatna et al. |
| 8,621,637 | B2 | 12/2013 | Al-harbi et al. |
| 8,789,190 | B2 | 7/2014 | Russell et al. |

(Continued)

FOREIGN PATENT DOCUMENTS

| | | |
|---|---|---|
| CN | 107277021 A | 10/2017 |
| CN | 108011893 A | 5/2018 |

(Continued)

*Primary Examiner* — Jung W Kim
*Assistant Examiner* — James P Moles
(74) *Attorney, Agent, or Firm* — Perkins Coie LLP

(57) ABSTRACT

Systems and methods are disclosed comprising instructions to collect vulnerability information over a network from a publishing source, collect network asset information of a communications network, generate a self-executing scanner agent configured to automatically scan the communications network for a known vulnerability based on an input including the collected vulnerability information and the collected network asset information, deploy the scanner agent at any network assets of the communications network that match a particular type of network asset indicated in the collected vulnerability information, generate a record including an indication of a particular network asset of the communications network in association with the known vulnerability in response to the scanner agent executing and detecting the known vulnerability in the particular network asset, and store the record in a data repository that aggregates records of detected known vulnerabilities in association with network assets of the communications network.

20 Claims, 9 Drawing Sheets

(56) References Cited

U.S. PATENT DOCUMENTS

| | | | |
|---|---|---|---|
| 8,789,192 B2 | 7/2014 | Labumbard | |
| 8,966,639 B1 | 2/2015 | Roytman et al. | |
| 9,246,935 B2 | 1/2016 | Lietz et al. | |
| 9,251,351 B2 | 2/2016 | Hugard et al. | |
| 9,270,695 B2 | 2/2016 | Roytman et al. | |
| 9,298,927 B2 | 3/2016 | Lietz et al. | |
| 9,467,464 B2 | 10/2016 | Gula et al. | |
| 9,602,550 B2 | 3/2017 | Bezilla et al. | |
| 9,628,501 B2 | 4/2017 | Datta et al. | |
| 9,692,778 B1 | 6/2017 | Mohanty | |
| 9,699,209 B2 | 7/2017 | Ng et al. | |
| 9,846,780 B2 | 12/2017 | Tonn et al. | |
| 9,886,582 B2 | 2/2018 | Hovor et al. | |
| 9,990,499 B2 | 6/2018 | Chan et al. | |
| 10,185,832 B2 | 1/2019 | Cam | |
| 10,284,589 B2 | 5/2019 | Hamdi | |
| 10,454,963 B1 | 10/2019 | Smith | |
| 10,542,050 B2 | 1/2020 | Castel | |
| 10,713,586 B2 | 7/2020 | Lim | |
| 11,005,876 B2 | 5/2021 | Moore et al. | |
| 11,057,418 B2 | 7/2021 | Ocepek et al. | |
| 11,277,429 B2 | 3/2022 | Ababtain et al. | |
| 11,363,041 B2 | 6/2022 | Paquin et al. | |
| 11,381,590 B2 | 7/2022 | Alsaeed et al. | |
| 11,388,184 B2 | 7/2022 | Siddiq | |
| 11,425,157 B2 | 8/2022 | Tan et al. | |
| 11,438,362 B2 | 9/2022 | Aleidan | |
| 11,526,614 B2 | 12/2022 | Fang | |
| 11,611,562 B2 | 3/2023 | Tiwari et al. | |
| 11,677,773 B2 | 6/2023 | Iyer et al. | |
| 11,729,197 B2 | 8/2023 | Cruz et al. | |
| 11,824,886 B2 * | 11/2023 | Lekies | H04L 63/029 |
| 11,930,031 B2 | 3/2024 | Smith et al. | |
| 12,015,631 B2 | 6/2024 | Morgan | |
| 2006/0031938 A1 | 2/2006 | Choi | |
| 2006/0265324 A1 | 11/2006 | Leclerc et al. | |
| 2009/0099885 A1 | 4/2009 | Sung et al. | |
| 2010/0064362 A1 | 3/2010 | Materna et al. | |
| 2013/0074188 A1 | 3/2013 | Giakouminakis et al. | |
| 2013/0096980 A1 | 4/2013 | Basavapatna et al. | |
| 2014/0075564 A1 | 3/2014 | Singla et al. | |
| 2021/0152588 A1 * | 5/2021 | Cruz | G06F 8/658 |
| 2022/0159028 A1 | 5/2022 | Kumar et al. | |
| 2023/0054912 A1 | 2/2023 | Dixit J et al. | |
| 2023/0156030 A1 * | 5/2023 | Bassi | H04L 63/1408 726/25 |
| 2023/0205891 A1 | 6/2023 | Yellapragada et al. | |
| 2023/0216875 A1 | 7/2023 | Barbosa et al. | |
| 2023/0336581 A1 | 10/2023 | Dunn et al. | |
| 2024/0037245 A1 * | 2/2024 | Kahan | H04L 63/1433 |
| 2024/0098107 A1 | 3/2024 | Al Jarri et al. | |
| 2024/0333746 A1 * | 10/2024 | Williams | G06F 11/3624 |

FOREIGN PATENT DOCUMENTS

| | | |
|---|---|---|
| CN | 108712396 A | 10/2018 |
| CN | 109167799 A | 1/2019 |
| CN | 109327461 A | 2/2019 |
| CN | 111199042 A | 5/2020 |
| CN | 107094158 B | 6/2020 |
| CN | 107239705 B | 7/2020 |
| CN | 111447224 A | 7/2020 |
| CN | 111695770 A | 9/2020 |
| CN | 112100545 A | 12/2020 |
| CN | 112257070 A | 1/2021 |
| CN | 108183895 B | 3/2021 |
| CN | 112491874 A | 3/2021 |
| CN | 112511512 A | 3/2021 |
| CN | 112532647 A | 3/2021 |
| CN | 111865981 B | 5/2021 |
| CN | 108737425 B | 6/2021 |
| CN | 112995207 B | 9/2021 |
| CN | 113468542 A | 10/2021 |
| CN | 113542275 A | 10/2021 |
| CN | 113392409 B | 12/2021 |
| CN | 110719300 B | 2/2022 |
| CN | 113238536 B | 3/2022 |
| CN | 112839047 B | 3/2023 |
| CN | 115408701 B | 6/2023 |
| CN | 115314276 B | 7/2023 |
| CN | 113949565 B | 10/2023 |
| CN | 114826726 B | 2/2024 |
| CN | 117473512 B | 3/2024 |
| CN | 116822804 B | 4/2024 |
| JP | 6023121 B2 | 10/2016 |
| KR | 100656351 B1 | 12/2006 |
| KR | 101022167 B1 | 3/2011 |
| KR | 101292640 B1 | 8/2013 |
| KR | 101310487 B1 | 9/2013 |
| KR | 102159292 B1 | 9/2020 |
| KR | 102439817 B1 | 9/2022 |
| KR | 102507464 B1 | 3/2023 |
| WO | 2014107104 A1 | 7/2014 |
| WO | 2015127170 A2 | 8/2015 |
| WO | 2015134572 A1 | 9/2015 |
| WO | 2016186662 A1 | 11/2016 |
| WO | 2017059279 A1 | 4/2017 |
| WO | 2018049437 A2 | 3/2018 |

* cited by examiner

Affected Products

Vulnerable Products

This vulnerability affects Cisco ASA Software running on the following products:

- Cisco ASA 1000V Cloud Firewall
- Cisco ASA 5500 Series Adaptive Security Appliances
- Cisco ASA 5500-X Series Next-Generation Firewalls
- Cisco ASA Services Module for Cisco Catalyst 6500 Series Switches and Cisco 7600 Series Routers
- Cisco Adaptive Security Virtual Appliance (ASAv)
- Cisco Firepower 9300 ASA Security Module
- Cisco ISA 3000 Industrial Security Appliance Refer to the "Fixed Software" section of this security advisory for more information about affected releases.

*FIG. 2A*

Fixed Releases

In the following table, the left column lists major releases of Cisco ASA Software. The right column indicates whether a major release is affected by the vulnerability described in this advisory and the first release that includes the fix for this vulnerability.

| Cisco ASA Software Major Release | First Fixed Release |
|---|---|
| Prior to 9.0* | Affected, migrate to 9.1(7.12) or later |
| 9.0* | Affected, migrate to 9.1(7.12) or later |
| 9.1 | 9.1(7.12) or later |
| 9.2 | 9.2(4.18) or later |
| 9.3* | Affected, migrate to 9.4(3.12) or later |
| 9.4 | 9.4(3.12) or later |
| 9.5 | 9.5(3.2) or later |
| 9.6 | 9.6(2.2) or later |
| 9.7 | Not affected |
| 9.8 | Not affected |

*Cisco ASA Software releases prior to 9.1 and Cisco ASA Software Release 9.3 have reached end-of-software maintenance. Customers should migrate to a supported release.

*FIG. 2B*

```
"CVE_data_meta" : {
  "ID" : "CVE-2017-6607",
  "ASSIGNER" : "cve@mitre.org"
},
"affects" : {
  "vendor" : {
    "vendor_data" : [ {
      "vendor_name" : "cisco",
      "product" : {
        "product_data" : [ {
          "product_name" : "adaptive_security_appliance_software",
          "version" : {
            "version_data" : [ {
              "version_value" : "9.0.1"
            }, {
              "version_value" : "9.0.2"
            }, {
              "version_value" : "9.0.2.10"
```

```
- <ProductTree xmlns="http://docs.oasis-open.org/csaf/ns/csaf-cvrf/v1.2/prod">
  - <Branch Type="Vendor" Name="Cisco">
    - <Branch Type="Product Name" Name="Cisco Adaptive Security Appliance (ASA) Software">
      - <FullProductName ProductID="CVRFPID-6588">Cisco Adaptive Security
            Appliance (ASA) Software </FullProductName>
      </Branch>
    </Branch>
  </ProductTree>
```

FIG. 2E

```
      - <Branch Type="Service Pack" Name="15.4(1)SY3">
            <FullProductName ProductID="CVRFPID-228056">Cisco IOS 15.4SY
            15.4(1)SY3</FullProductName>
        </Branch>
      </Branch>
  - <Branch Type="Product Version" Name="15.5SY">
      - <Branch Type="Service Pack" Name="15.5(1)SY">
            <FullProductName ProductID="CVRFPID-225786">Cisco IOS 15.5SY
             15.5(1)SY</FullProductName>
        </Branch>
      </Branch>
  </Branch>
- <Branch Type="Product Name" Name="Cisco IOS XE Software">
  - <Branch Type="Product Version" Name="3.3SG">
    - <Branch Type="Service Pack" Name="3.3.0SG">
            <FullProductName ProductID="CVRFPID-188726">Cisco IOS XE Software
             3.3SG 3.3.0SG</FullProductName>
      </Branch>
    - <Branch Type="Service Pack" Name="3.3.2SG">
            <FullProductName ProductID="CVRFPID-196228">Cisco IOS XE Software
             3.3SG 3.3.2SG</FullProductName>
      </Branch>
    - <Branch Type="Service Pack" Name="3.3.1SG">
            <FullProductName ProductID="CVRFPID-196287">Cisco IOS XE Software
             3.3SG 3.3.1SG</FullProductName>
      </Branch>
    </Branch>
```

FIG. 2F

GENERATIVE SYSTEMS AND METHODS FOR ADAPTIVE VULNERABILITY MANAGEMENT

BACKGROUND

Vulnerability management is a crucial aspect of computer and network security, involving the cyclical process of identifying, classifying, prioritizing, remediating, and mitigating system vulnerabilities. These vulnerabilities can stem from outdated or defective software components that are susceptible to attacks or failures. Scanner systems can identify these vulnerabilities, such as open ports, unsecure configurations, or susceptibility to malware. However, these scanners are not always reliable as they treat all computer systems identically, searching for the same vulnerability signatures which can vary across different systems.

At the heart of vulnerability management is the publication of "common vulnerabilities and exposures" (CVEs), which include lists of computer assets that pose security vulnerabilities and exposures. These CVEs can be shared across different organizations, tools, repositories, and services using a common scheme. A vulnerability management system (VMS) can mitigate these vulnerabilities by updating equipment, software, or configurations. However, existing solutions often struggle to identify suitable security patches for specific computer assets to mitigate a risk and thus cannot address specific risks faced by particular organizations.

BRIEF DESCRIPTION OF THE DRAWINGS

Detailed descriptions of implementations of the present invention will be described and explained through the use of the accompanying drawings.

FIG. 2A depicts common vulnerabilities and exposures (CVE) information corresponding to a product security incident response team (PSIRT) advisory including a set of vulnerable products.

FIG. 2B depicts a CVE corresponding to a PSIRT advisory including a set of patches for known vulnerabilities.

FIG. 2E depicts a CVE corresponding to a CISCO common vulnerability reporting framework (CVRF) in Extensible Markup Language (XML) format (non-IOS).

FIG. 2F depicts a CVE corresponding to a CISCO CVRF XML file (IOS/IOS XE).

Figure 1:
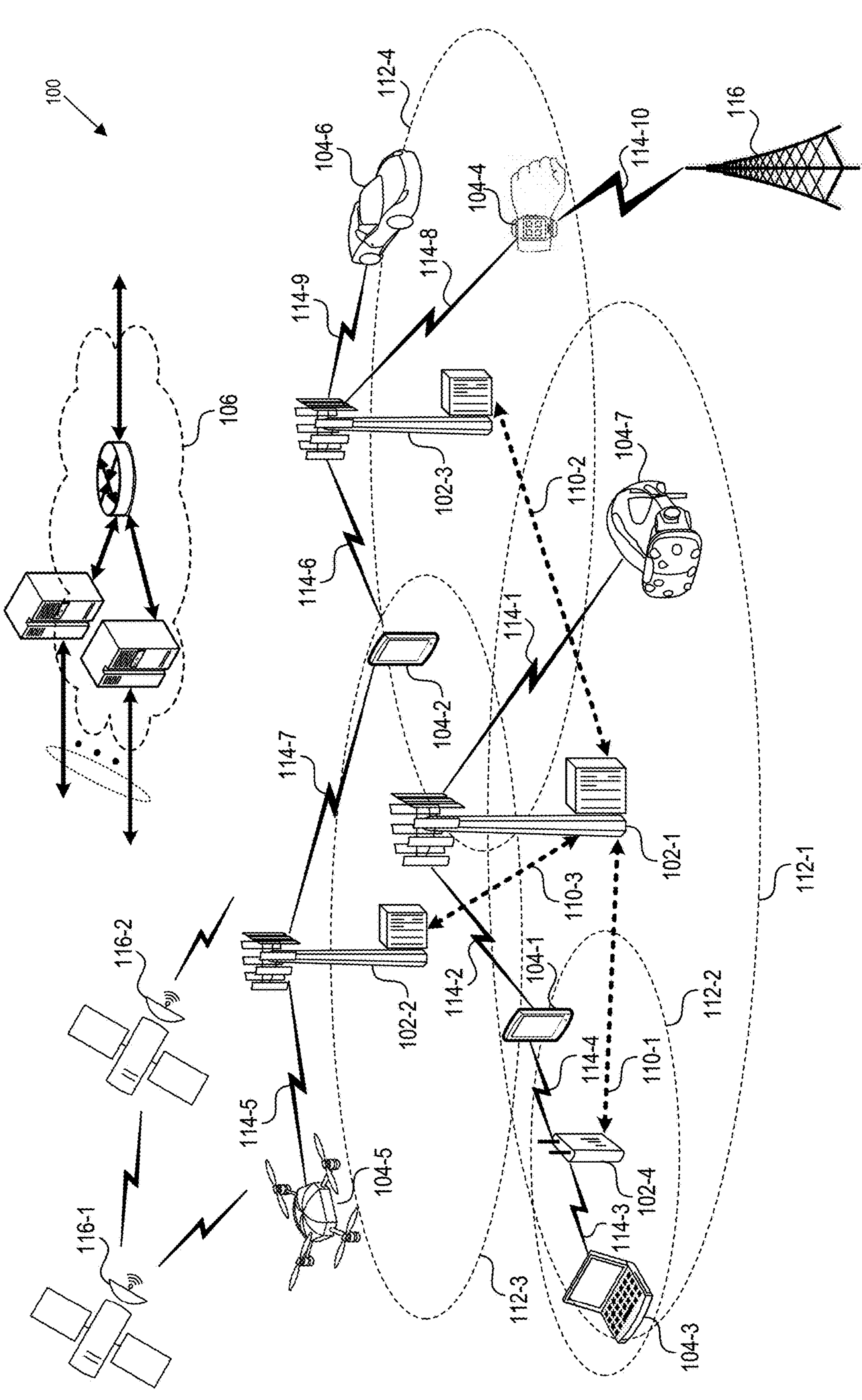
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed herein are systems and related methods for generating adaptive scanner agents capable of identifying vulnerable network assets (e.g., a hardware asset, a software asset, or a configuration for the network) within a communications system. The disclosed system evaluates vulnerability information collected from CVEs to implement custom scanner agents (e.g., automated asset search and evaluation programs) via leveraging generative artificial intelligence (AI) models to target vulnerable network asset types of a computer system.

The disclosed system can identify potential vulnerabilities of network assets within a communications system based on information extracted from CVEs. As an illustrative example, the disclosed system can actively monitor and respond to incoming CVEs from verified publishing sources (e.g., a public vulnerability database, a vendor of specific network assets) by determining relevant network assets that may be impacted by vulnerabilities described in the CVEs. In particular, the disclosed system can use generative AI models to identify network assets of the communications system that are related to specified types of network assets afflicted by the described vulnerabilities.

In additional aspects, the disclosed system can use generative AI models to create custom scanner agents (e.g., search and/or evaluation programs) that assess the identified network assets for indications of the described vulnerabilities. For example, the disclosed system can generate custom executable software with built-in functions specifically tailored for evaluating the vulnerabilities, and associated network asset types, that are described in the CVEs. Accordingly, the system can use the custom scanner to automate search of relevant network assets within the communications service and identify assets afflicted by the described vulnerabilities. In response to positive indications of asset vulnerabilities, the disclosed system can generate a stored record of detected network assets for further inspection and remediation by human analysts.

In other aspects, the disclosed system can automatically improve the generative AI models used to identify relevant network assets and implement custom scanner agents. As an example, the disclosed system can identify new vulnerabilities of network assets that are absent from the set of known vulnerabilities described in CVEs. Accordingly, the disclosed system can use the identified new vulnerabilities to iteratively retrain the generative AI models to recognize relevant network assets when generating scanner agents for detecting similar vulnerabilities in the future.

In contrast, existing systems typically rely on a manual vetting process (e.g., performed by a human analyst) to recognize incoming vulnerability information from CVEs, identify network assets relevant to known vulnerabilities, and execute non-standardized scans to verify detection of specific computing assets (e.g., dependent network services) affected by known vulnerabilities. Manual response and remediation of incoming CVEs is a time-expensive process that often requires several hours, or days, to complete. Accordingly, existing systems are typically slow and inefficient at addressing time-sensitive tasks for maintaining secure computing systems. To further compound this issue, large and distributed computing infrastructures (e.g., communications networks) often rely on unique and complex combinations of dependent services (e.g., software versions, hardware components, third-party services) that naturally require additional time for manual analysis and remediation. As a result, these and other problems of inefficient manual response to potential vulnerabilities of communications network systems can significantly diminish the overall user experience (e.g., via insecure platforms) and place undue burden on maintenance support teams, negatively impact service providers and third-party services, and so forth.

Accordingly, there is a need for technologies that overcome the foregoing problems and provide additional benefits that enable communications network providers to efficiently identify and address potential vulnerabilities within a network system. For example, there is a need for a fast and robust system that can intelligently identify target (e.g., relevant) computing assets of a network system that may include known vulnerabilities described within incoming CVEs. Additionally, there is a need for a smart system that can automatically generate and execute scanner agents that detect presence of known vulnerabilities within identified target assets.

Advantages of the disclosed technology include a robust automation process for analyzing incoming vulnerability information from CVEs, identifying relevant computing assets for known vulnerabilities, and executing custom scans of target assets within the network system. As a result, the disclosed technology can minimize processing time for each CVE while reducing necessary manual labor to supervisory and refinement roles. Furthermore, the disclosed technology can intelligently self-improve the generative AI models used to create custom scanner agents by automatically retraining the models on newly discovered vulnerabilities within the network.

For illustrative purposes, examples are described herein in the context of computer systems for a communications (e.g., telecommunications) network. However, a person skilled in the art will appreciate that the disclosed system can be applied in other contexts. For example, the disclosed system can be used to intelligently analyze critical vulnerability information from incoming CVEs and automatically generate custom scanner agents for identifying vulnerable assets within a computing environment and/or system.

The operation to generate automatic scanner agents (e.g., via generative AI models) for detecting vulnerable computing assets as disclosed herein causes a reduction in greenhouse gas emissions compared to conventional methods of manual vulnerability analysis. Every year, approximately 40 billion tons of carbon dioxide are emitted around the world. Power consumption by digital technologies, including computing systems of telecommunications networks, account for approximately 4% of this figure. Further, extended use of computing resources by maintenance support teams for manually processing CVEs exacerbates the causes of climate change. For example, the average U.S. power plant expends approximately 600 grams of carbon dioxide for every kilowatt-hour generated. The implementations disclosed herein for automatic generation and deployment of scanner agents can mitigate climate change by reducing and/or preventing additional greenhouse gas emissions into the atmosphere. For example, automating vulnerability analysis (e.g., via generative AI) in response to incoming CVEs as described herein significantly reduces processing time, and subsequently electrical power consumption, of network systems. By reducing manual analysis time, the disclosed systems provide increased energy and computational resource efficiency compared to traditional methods.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 (referred to as "network 100" or "communications network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Cybersecurity Vulnerabilities and Exposure Analysis

Figures 2C, 2D:
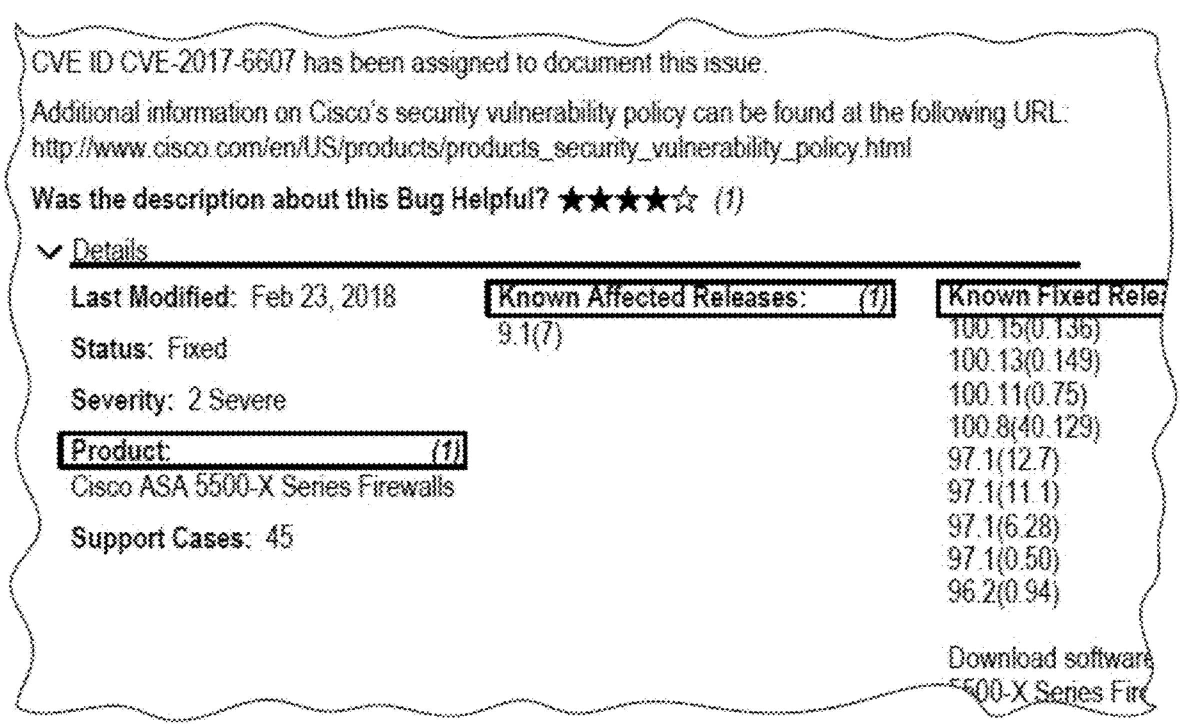
FIG. 2C depicts a CVE corresponding to a bug report including details regarding the state of a known vulnerability.
FIG. 2D depicts a CVE in a JavaScript Object Notation (JSON) format obtained from the national vulnerability database (NVD) maintained by the National Institute of Standards and Technology (NIST).

FIGS. 2A through 2C depict examples of human-readable common vulnerabilities and exposures (CVEs). Specifically, FIG. 2A depicts a CVE corresponding to a product security incident response team (PSIRT) advisory including a set of vulnerable products. FIG. 2B depicts a CVE corresponding to a PSIRT advisory including a set of patches for known vulnerabilities. FIG. 2C depicts a CVE corresponding to a bug report including details regarding the affected and fixed software versions. The human-readable CVEs are normally reviewed manually by human analysts to understand the scope of affected computer assets and determine a potential risk to a computer system.

FIGS. 2D through 2F depict examples of machine-readable CVEs. Specifically, FIG. 2D depicts a CVE in a JavaScript Object Notation (JSON) format obtained from the NIST's NVD. FIG. 2E depicts a CVE corresponding to a CISCO common vulnerability reporting framework (CVRF) in Extensible Markup Language (XML) format (non-IOS). FIG. 2F depicts a CVE corresponding to a CISCO CVRF XML file (IOS/IOS XE). The machine-readable CVEs are computer system agnostic and, as such, regularly result in false positives and false negatives.

Figure 3:
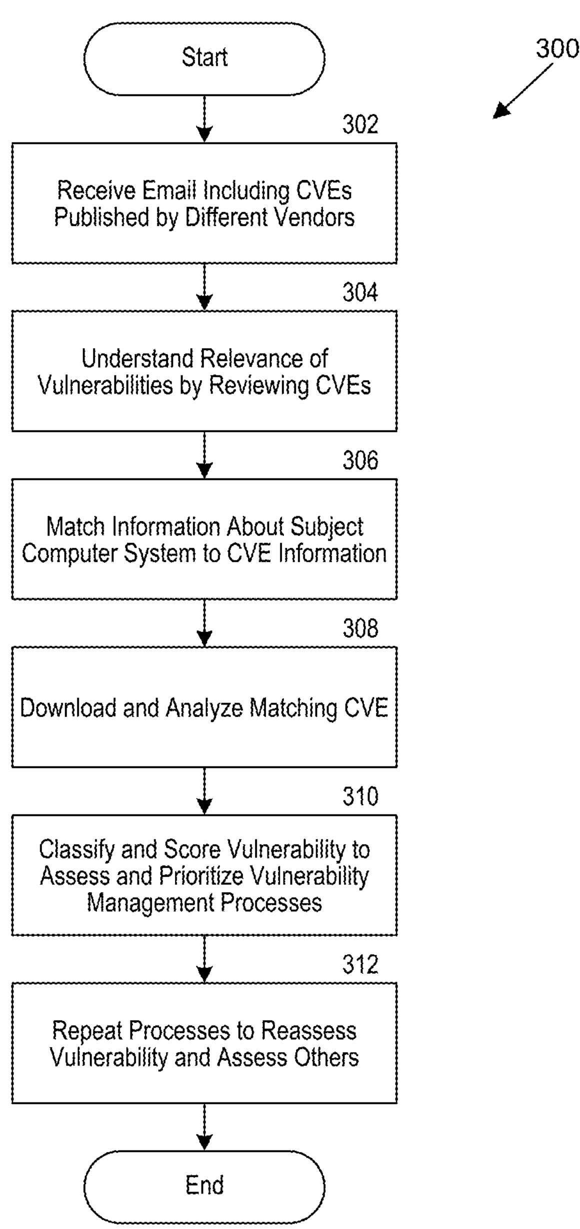
FIG. 3 is a flow diagram of a CVE analysis that can be performed manually.

FIG. 3 is a flow diagram of a CVE analysis that can be performed manually to identify, classify, prioritize, remediate, and mitigate vulnerabilities. The process 300 can be performed by a human analyst. In some instances, at least some portions of the process 300 are automated. The lack of full automation results in re-introductions of vulnerabilities because the average exposure days to detect vulnerabilities could be several months, which increases security risks and causes costly delays. For example, a critical vulnerability can have a broad impact on diverse computer systems but take several weeks to address due to the time consuming and labor-intensive human analysis. Moreover, the lack of self-serve capabilities encourages sharing vulnerability data via Excel and emails, which poses another security risk.

In 302, an organization that subscribes to a vulnerability management service can receive an email that includes a set of CVEs published by vendors. A human analyst must review each CVE in the email to identify any that are relevant to the organization's computer system. In 304, the analyst performs an assessment of the CVEs to determine whether any of the CVEs are relevant to the organization. In particular, the analyst reviews each CVE to understand, for example, whether any outdated versions of computer assets could detrimentally impact the organization's network. Based on that assessment and vender classification of vulnerabilities, the analyst can prioritize addressing vulnerabilities.

In 306, the analyst assesses the computer assets of the computer system that is subject to vulnerability management. For example, the analyst can review the organization's computer assets to determine whether versions of those assets match versions identified in the CVEs. For example, the analyst can prepare a command based on the version information in the CVEs. The computer system executes the command to collect log information to match computer assets in the computer system with the CVEs.

In 308, after the analyst has identified a matching vulnerability in the computer system, the analyst can then download the matching CVE from a vendor's website. The analyst can analyze the contents of the downloaded CVE and correlates results of system-specific information with the vendor's CVE information.

In 310, the analyst can classify and score a vulnerability based on the common vulnerability scoring system (CVSS). The CVSS describes a way to capture characteristics of a vulnerability and produce a numerical score reflecting its severity. The numerical score can be translated into a qualitative representation (e.g., low, medium, high, and critical) to help an organization assess and prioritize vulnerability management processes. Based on the classification and score, the analyst can update a vulnerability tracker and inform stakeholders of any risk.

In 312, the analyst can repeat the same analysis to reassess vulnerability and ensure that the computer system complies with the most current vender CVE updates. Moreover, the analyst can perform the same analysis for other CVEs.

Generative Vulnerability Management System

Figure 4:
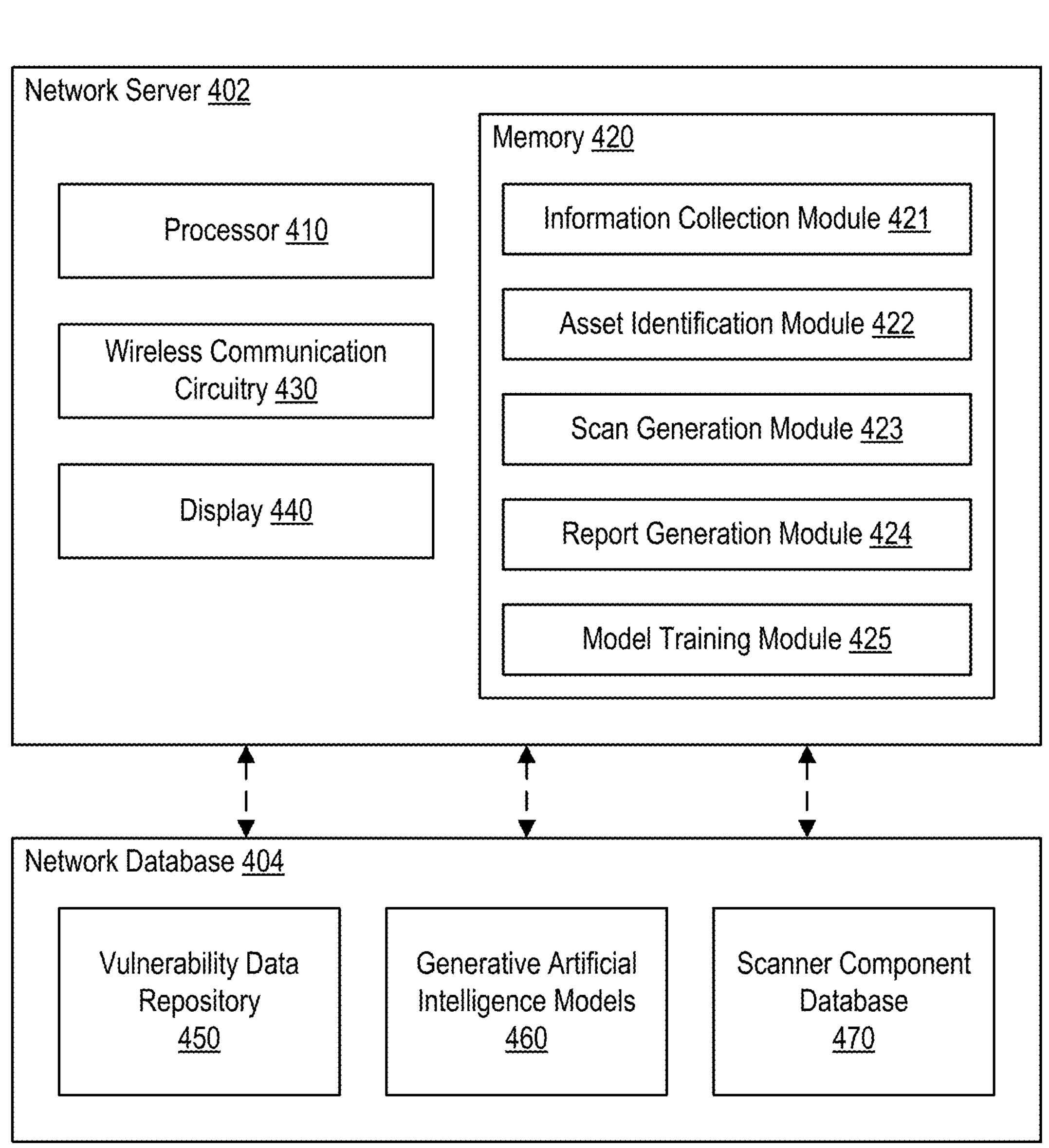
FIG. 4 is a block diagram that illustrates a generative vulnerability management system that can implement aspects of the present technology.

FIG. 4 is a block diagram that illustrates a generative vulnerability management system (referred to as "vulnerability management system 400" or "system 400") that can implement aspects of the present technology. The components shown in FIG. 4 are merely illustrative, and well-known components are omitted for brevity. As shown, the network server 402 includes a processor 410, a memory 420, a wireless communication circuitry 430 to establish wireless communication channels (e.g., telecommunications, internet) with other computing devices and/or services (e.g., servers, databases, cloud infrastructure), and a display 440. The processor 410 can have generic characteristics similar to general-purpose processors, or the processor 410 can be an application-specific integrated circuit (ASIC) that provides arithmetic and control functions to the network server 402. While not shown, the processor 410 can include a dedicated cache memory. The processor 410 can be coupled to all components of the network server 402, either directly or indirectly, for data communication. Further, the processor 410 of the network server 402 can be communicatively coupled to a network database 404 that is hosted alongside the network server 402 on the core network 106 described in reference to FIG. 1. As shown, the network database 404 can include a vulnerability data repository (VDR) 450, generative artificial intelligence (AI) models 460, and a scanner component database 470.

The memory 420 can comprise any suitable type of storage device including, for example, a static random-access memory (SRAM), dynamic random-access memory (DRAM), electrically erasable programmable read-only memory (EEPROM), flash memory, latches, and/or registers. In addition to storing instructions that can be executed by the processor 410, the memory 420 can also store data generated by the processor 410 (e.g., when executing the modules of an optimization platform). In additional or alternative implementations, the processor 410 can store temporary information onto the memory 420 and store long-term data onto the network database 404. The memory 420 is merely an abstract representation of a storage environment. Hence, in some implementations, the memory 420 comprises one or more actual memory chips or modules.

As shown in FIG. 4, modules of the memory 420 can include an information collection module 421, an asset identification module 422, a scan generation module 423, a report generation module 424, and a model training module 425. Other implementations of the network server 402 include additional, fewer, or different modules, or distribute functionality differently between the modules. As used herein, the term "module" refers broadly to software components, firmware components, and/or hardware components. Accordingly, the modules 421, 422, 423, 424, 425 could each comprise software, firmware, and/or hardware components implemented in, or accessible to, the network server 402.

The information collection module 421 can be configured to retrieve vulnerability information over a network (e.g., internet, telecommunications network) from a publishing source. For example, the information collection module 421 can configure the wireless communication circuitry 430 to actively monitor network activity (e.g., via real-time network listeners) to detect incoming CVEs published onto a public repository. In some implementations, CVEs can include vulnerability information for one or more network assets of a telecommunications network, such as known vulnerabilities (e.g., vulnerable execution patterns, target source code, and/or the like) for a specified network asset type (e.g., hardware asset, software asset, or network configuration). In further implementations, the information collection module 421 can receive CVEs as files formatted in JavaScript Object Notation (JSON), Hypertext Markup Language (HTML), Extensible Markup Language (XML), and/or any combination thereof. In other implementations, the information collection module 421 can store retrieved CVEs and other associated vulnerability information onto a VDR 450, or a dedicated partition within the network database 404. In additional or alternative implementations, the information collection module 421 can trigger a scan request for identifying vulnerable network assets in response to detecting incoming CVEs.

In some implementations, the information collection module 421 can retrieve vulnerability information from both individual and aggregated publishing sources. For example, the information collection module 421 can obtain real-time CVE information directly from an individual vendor of a particular network asset, or network asset type. In another example, the information collection module 421 can obtain CVE information from a public national vulnerability database (NVD) that collects vulnerability information from a plurality of vendors for various network assets and/or network asset types. For both individual and aggregated publishing sources, the information collection module 421 can deploy a listener (e.g., real-time monitoring program) via the wireless communication circuitry 430 to monitor respective information channels (e.g., vendor and/or repository network portals) in real time. As an example, the information collection module 421 can automatically detect and download new CVE submissions from the monitored information channels for storage onto the VDR 450. In other implementations, the information collection module 421 can be configured to periodically obtain vulnerability information from the monitored information channels in accordance with a specified duration threshold.

In additional or alternative implementations, the information collection module 421 can access network asset information associated with a telecommunications network. For example, the information collection module 421 can retrieve information details (e.g., asset configuration, source code, deployment status, and/or the like) for network assets and/or network asset types of the telecommunications network. In some implementations, the information collection module 421 can obtain the information details (e.g., software and/or asset data user in operational network environment) for the network assets from a central repository stored on the network database 404, such as the VDR 450. As an illustrative example, the information collection module 421 can access a designated partition within the network database 404 (e.g., separate and/or isolated from the operational environment) comprising an aggregate collection of network asset information for the telecommunications network. Accordingly, the information collection module 421 can perform vulnerability management operations described herein as a separate process (e.g., independent service) that does not interfere with active services of the communications network.

The asset identification module 422 can be configured to identify network assets and/or network asset types of the telecommunications network that are relevant to vulnerability information (e.g., a set of known vulnerabilities) from CVEs. For example, the asset identification module 422 can retrieve identifiable asset information (e.g., tags, vendor, identifier, source code, and/or the like) for a particular afflicted network asset described in a CVE. Accordingly, the asset identification module 422 can use the identifiable asset information to search for similar network assets and/or network asset types stored in the VDR 450. In some implementations, the asset identification module 422 can generate a similarity parameter between the particular afflicted network asset and each network asset and/or network asset type of the VDR 450. The similarity parameter can be representative of a likelihood that the particular afflicted network asset and a network asset of the telecommunications network will share resources (e.g., software, hardware, configurations, and/or the like) that may be subject to a known vulnerability described in the CVE. In additional or alternative implementations, the asset identification module 422 can configure one or more generative AI models 460 (e.g., stored in the network database 404) to generate the similarity parameter between the particular afflicted network asset and network assets of the telecommunications network. Using the similarity parameter, the asset identification module 422 can further generate a set of similar network assets of the telecommunications network that are most relevant, dependent on, and/or similar to the particular afflicted network asset. As an example, the asset identification module 422 can be configured to add a candidate network asset to the set of similar network assets when the similarity parameter of the candidate network asset exceeds a first similarity threshold.

The scan generation module 423 can be configured to generate a self-executing scanner agent (e.g., an executable software asset) configured to automatically scan the telecommunications network for known vulnerabilities described in CVEs. For example, the scan generation module 423 can generate and/or deploy a custom scanner agent configured to examine one or more network assets from the set of similar network assets for known vulnerabilities associated with a particular network asset described in a CVE. In particular, the scan generation module 423 can generate the custom scanner agent based on executable scanner functions accessed via the scanner component database 470. The executable scanner functions can include specialized microservice assets (e.g., plug-in modules, functional scripts, and/or the like) designed to analyze a network asset for a specified vulnerability pattern. In some implementations, the executable scanner functions can comprise third-party vulnerability management assets received from vendors of network assets via the wireless communication circuitry 430. In other implementations, the scan generation module 423 can configure one or more generative AI models 460 to generate custom executable scanner functions based on network asset information from the VDR 450, vulnerability information from the CVE, and/or a combination thereof. Accordingly, the scan generation module 423 can be configured to assemble relevant executable scanner functions (e.g., stored in the scanner component database 470) for the custom scanner agent based on the particular network asset and/or the known vulnerabilities described in the CVE. In further implementations, the scan generation module 423 can deploy the custom scanner agent to scan network assets from the set of similar network assets that are most similar to the particular network asset specified in the CVE. As an example, the scan generation module 423 can be configured to deploy the custom scanner agent (e.g., enable self-execution) to scan network assets with a similarity parameter exceeding the first similarity threshold and a second similarity threshold.

The report generation module 424 can be configured to generate vulnerability records for network assets of the telecommunications service based on scan data of the self-executing scanner agents. For example, the report generation module 424 can access scan results of deployed scanner agents comprising a detection of known vulnerabilities within a set of target network assets. Using the scan results, the report generation module 424 can generate a vulnerability record comprising an indication of the vulnerable target network assets in association with the known vulnerabilities. In some implementations, the vulnerability record can include vulnerable network asset types, known vulnerabilities, identifiable asset information for vulnerable network assets, a set of detected vulnerable target network assets, a set of non-detected vulnerable target network assets, identified vulnerability patterns in vulnerable network assets, scan functions of scanner agents, and/or any combination thereof. In some implementations, the report generation module 424 can store the generated vulnerability records onto a dedicated partition of aggregated vulnerability records in the network database 404, such as the VDR 450.

In other implementations, the report generation module 424 can transmit a notification (e.g., a user interface alert, a warning signal, and/or the like) for generated vulnerability records to a subscribing service (e.g., an external user, a network operator, an asset vendor, and/or the like). In further implementations, the report generation module 424 can add a set of remediation options for addressing vulnerable network assets to the transmitted notification. For example, the report generation module 424 can generate a option (e.g., a selectable user interface element for display 440) for deploying a software patch for a vulnerable software asset to remove a risk of known vulnerabilities. In some implementations, the report generation module 424 can add an estimated financial risk of detected vulnerable network assets to the transmitted notification. As an example, the report generation module 424 can perform a risk valuation of known vulnerabilities on detected vulnerable network assets. In additional or alternative implementations, the report generation module 424 can configure one or more generative AI models 460 (e.g., stored in the network database 404) to generate a narrative for the transmitted notification that explains CVE details, known vulnerability patterns, identified vulnerable network assets, remediation options, financial risk assessments, and/or any combination thereof.

In other implementations, the asset identification module 422 can be configured to discover new potential vulnerabilities absent from known vulnerabilities described in CVEs. As an illustrative example, the asset identification module 422 can receive an incoming CVE comprising a vulnerable network asset type of a telecommunications network and an associated known vulnerability. Accordingly, the asset identification module 422 can calculate a correlation value between the known vulnerability and a candidate network asset type of the telecommunications service that is different from the vulnerable network asset type. In particular, the asset identification module 422 can calculate a similarity score between the vulnerable network asset type (e.g., first network asset type) and the candidate network asset type (e.g., second network asset type). In other implementations, the asset identification module 422 can calculate a relevance score for the candidate network asset type to the known vulnerability. As such, the asset identification module 422 can identify new potential vulnerabilities (e.g., absent from known vulnerabilities) of the candidate network asset based on the calculated correlation value exceeding a specified correlation threshold. In response to determining a potential vulnerability, the asset identification module 422 can submit a request for generating and deploying a self-executing scanner agent to identify the potential vulnerability within network assets of type similar to the candidate network asset. In additional or alternative implementations, the report generation module 424 can store vulnerability records associated with the new potential vulnerability and/or the candidate network asset in the network database 404.

The model training module 425 can be configured to improve (e.g., retrain and/or refine) the one or more generative AI models 460 frequently used for identifying vulnerable network assets, assembling self-executing scanner agents, and/or generating detailed vulnerability reports. For example, the model training module 425 can update one or more parameters of a select generative AI model based on an aggregated vulnerability dataset from the VDR 450. The aggregated vulnerability dataset can include vulnerability data entries each comprising a network asset vulnerability (e.g., execution patterns, source code), identifiable information of vulnerable network assets, vulnerable network asset types, and/or any combination thereof. In some implementations, the model training module 425 can generate, or add onto, aggregated vulnerability datasets based on vulnerability information from incoming CVEs and scan results of network assets. For example, the model training module 425 can create new vulnerability data entries based on known vulnerability patterns, specified vulnerable asset types, detected vulnerable network assets, non-detected vulnerable network assets, and/or relevant scan functions.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 5:
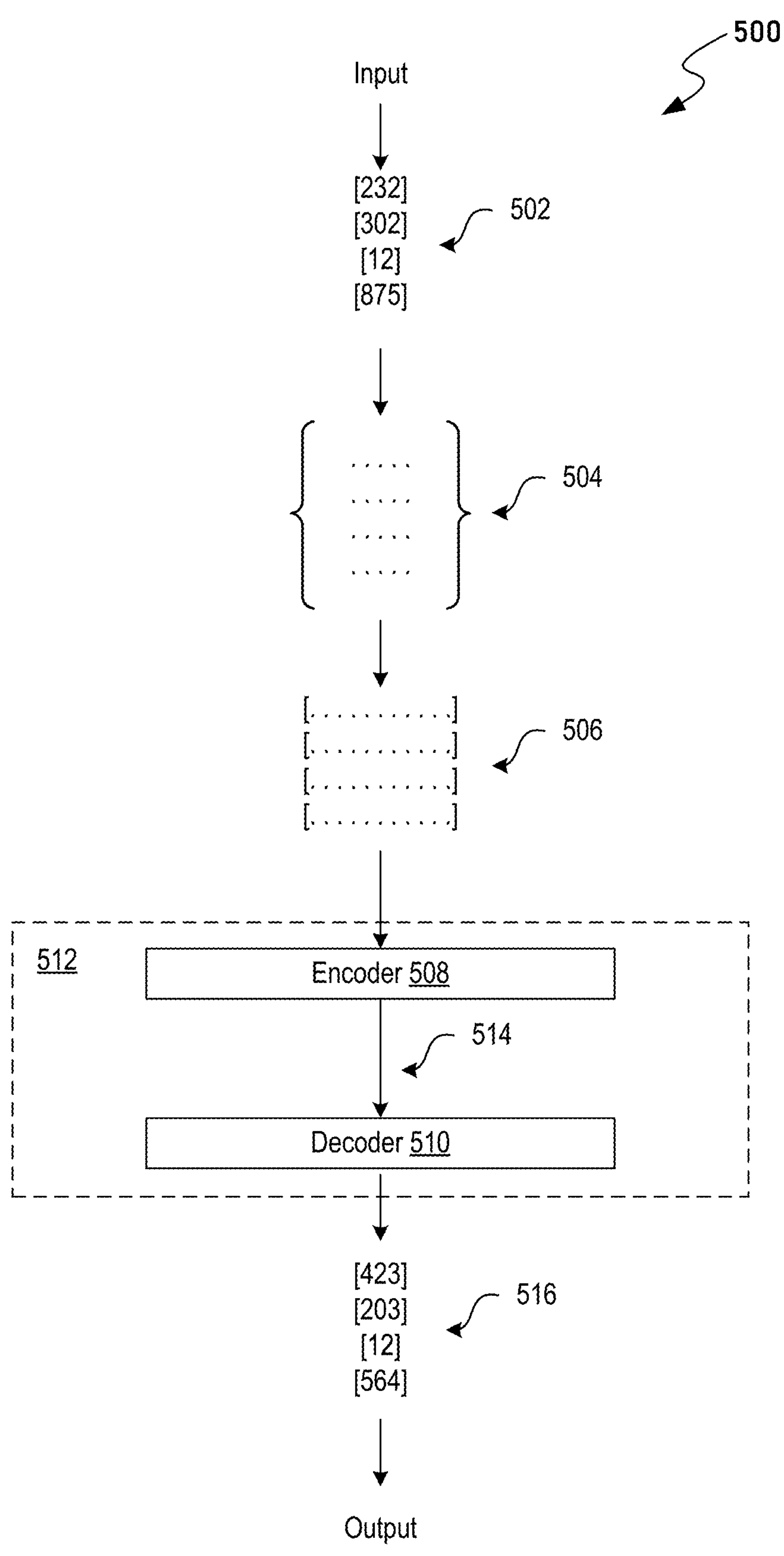
FIG. 5 is a block diagram of an example transformer in some implementations of the present technology.

FIG. 5 is a block diagram of an example transformer 512. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as RNN-based language models.

The transformer 512 includes an encoder 508 (which can comprise one or more encoder layers/blocks connected in series) and a decoder 510 (which can comprise one or more decoder layers/blocks connected in series). Generally, the encoder 508 and the decoder 510 each include a plurality of neural network layers, at least one of which can be a self-attention layer. The parameters of the neural network layers can be referred to as the parameters of the language model.

The transformer 512 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 512 is trained to perform certain functions on other input formats than natural language input. For example, the input can include objects, images, audio content, or video content, or a combination thereof.

The transformer 512 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 5 illustrates an example of how the transformer 512 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 5, a short sequence of tokens 502 corresponding to the input text is illustrated as input to the transformer 512. Tokenization of the text sequence into the tokens 502 can be performed by some pre-processing tokenization module such as, for example, a byte-pair encoding tokenizer (the "pre" referring to the tokenization occurring prior to the processing of the tokenized input by the LLM), which is not shown in FIG. 5 for simplicity. In general, the token sequence that is inputted to the transformer 512 can be of any length up to a maximum length defined based on the dimensions of the transformer 512. Each token 502 in the token sequence is converted into an embedding vector 506 (also referred to simply as an embedding 506). An embedding 506 is a learned numerical representation (such as, for example, a vector) of a token that captures some semantic meaning of the text segment represented by the token 502. The embedding 506 represents the text segment corresponding to the token 502 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 506 corresponding to the "write" token will be closer to another embedding corresponding to the "jot down" token in the vector space as compared to the distance between the embedding 506 corresponding to the "write" token and another embedding corresponding to the "summary" token.

The vector space can be defined by the dimensions and values of the embedding vectors. Various techniques can be used to convert a token 502 to an embedding 506. For example, another trained ML model can be used to convert the token 502 into an embedding 506. In particular, another trained ML model can be used to convert the token 502 into an embedding 506 in a way that encodes additional information into the embedding 506 (e.g., a trained ML model can encode positional information about the position of the token 502 in the text sequence into the embedding 506). In some examples, the numerical value of the token 502 can be used to look up the corresponding embedding in an embedding matrix 504 (which can be learned during training of the transformer 512).

The generated embeddings 506 are input into the encoder 508. The encoder 508 serves to encode the embeddings 506 into feature vectors 514 that represent the latent features of the embeddings 506. The encoder 508 can encode positional information (i.e., information about the sequence of the input) in the feature vectors 514. The feature vectors 514 can have very high dimensionality (e.g., on the order of thousands or tens of thousands), with each element in a feature vector 514 corresponding to a respective feature. The numerical weight of each element in a feature vector 514 represents the importance of the corresponding feature. The space of all possible feature vectors 514 that can be generated by the encoder 508 can be referred to as the latent space or feature space.

Conceptually, the decoder 510 is designed to map the features represented by the feature vectors 514 into meaningful output, which can depend on the task that was assigned to the transformer 512. For example, if the transformer 512 is used for a translation task, the decoder 510 can map the feature vectors 514 into text output in a target language different from the language of the original tokens 502. Generally, in a generative language model, the decoder 510 serves to decode the feature vectors 514 into a sequence of tokens. The decoder 510 can generate output tokens 516 one by one. Each output token 516 can be fed back as input to the decoder 510 in order to generate the next output token 516. By feeding back the generated output and applying self-attention, the decoder 510 is able to generate a sequence of output tokens 516 that has sequential meaning (e.g., the resulting output text sequence is understandable as a sentence and obeys grammatical rules). The decoder 510 can generate output tokens 516 until a special [EOT] token (indicating the end of the text) is generated. The resulting sequence of output tokens 516 can then be converted to a text sequence in post-processing. For example, each output token 516 can be an integer number that corresponds to a vocabulary index. By looking up the text segment using the vocabulary index, the text segment corresponding to each output token 516 can be retrieved, the text segments can be concatenated together, and the final output text sequence can be obtained.

In some examples, the input provided to the transformer 512 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Figure 6:
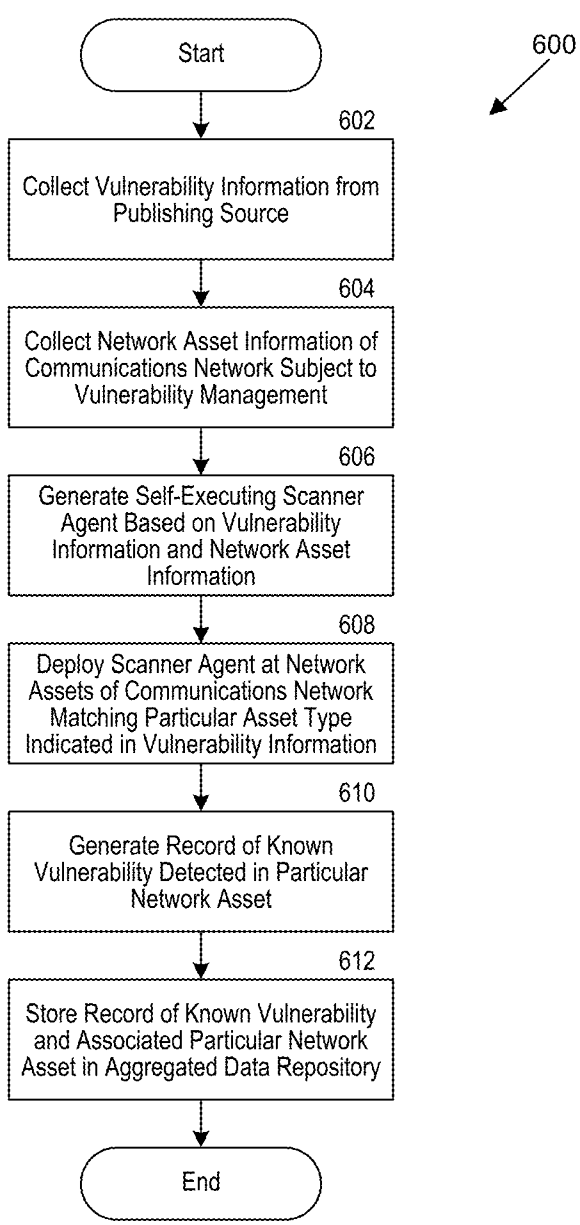
FIG. 6 is a flow diagram that illustrates a process to scan for vulnerable network assets in some implementations.

FIG. 6 is a flow diagram that illustrates a process to scan for vulnerable network assets in some implementations. The process 600 can be performed by a system (e.g., a generative vulnerability management system 400) configured to generate custom scanner agents for identifying vulnerable network assets of a communications network. In one example, the system includes at least one hardware processor and at least one non-transitory memory storing instructions, which, when executed by the at least one hardware processor, cause the system to perform the process 600. In another example, the system includes a non-transitory, computer-readable storage medium comprising instructions recorded thereon, which, when executed by at least one data processor, cause the system to perform the process 600.

At 602, the system can collect vulnerability information over a network from a publishing source such that the vulnerability information includes CVEs published on a public repository. For example, the system can collect CVEs that include a known vulnerability for a particular type of network asset. In some implementations, the publishing source can comprise a public NVD that obtains the vulnerability information from a vendor of the particular type of network asset. In other implementations, the publishing source can comprise a vendor of the particular type of network asset and the vulnerability information is obtained directly from the vendor. In additional or alternative implementations, the system can automatically obtain vulnerability information periodically from a website administered by the vendor.

At 604, the system can collect network asset information of a communications network subject to vulnerability management such that the network asset information includes information about multiple types of network assets deployed in the communications network.

At 606, the system can generate a self-executing scanner agent configured to automatically scan the communications network for the known vulnerability based on an input including the collected vulnerability information and the collected network asset information. As an illustrative example, the system can configure a similarity parameter between the multiple types of network assets deployed in the communications network and the particular type of network asset. Accordingly, the system can configure a first threshold for the similarity parameter that, when exceeded, associates the scanner agent with a network asset of the communications network. In some implementations, the system can generate the self-executing scanner agent using a generative AI system.

In some implementations, the system can generate the self-executing scanner agent as a first scanner agent and identify the particular type of network asset as a first type of network asset. In such implementations, the system can further calculate a correlation value between the known vulnerability and a second type of network asset of the communications network. As an illustrative example, the system can calculate a similarity score between the first type of network asset and the second type of network asset. Alternatively, the system can calculate a relevance score for the second type of network asset relative to the known vulnerability. Using the similarity score and/or the relevance score, the system can identify the potential vulnerability based on the similarity score or the relevance score. Accordingly, the system can discover a potential vulnerability for the second type of network asset based on the calculated correlation value. The system can further generate a second scanner agent configured to self-execute scanning of the communications network for the potential vulnerability. In additional or alternative implementations, the system can train the generative AI system (e.g., for generating self-executing scanner agents) based on the records aggregated at the data repository and the potential vulnerability.

At 608, the system can deploy the scanner agent at any network assets of the communications network that match the particular type of network asset indicated in the collected vulnerability information. For example, the system can configure a second threshold for the scanner agent that, when exceeded, causes the scanner agent to self-execute scanning the network asset that exceeds the first threshold.

At 610, the system can generate a record including an indication of the particular network asset in association with the known vulnerability in response to the scanner agent executing and detecting the known vulnerability in a particular network asset (e.g., a software asset) of the communications network. In some implementations, the system can deploy a software patch for the software asset to remove a risk of the known vulnerability. In additional or alternative implementations, the system can estimate a financial risk of the known vulnerability to an operator of the communications network by performing a risk valuation of the known vulnerability on the particular network asset.

At 612, the system can store the record in a data repository that aggregates records of detected known vulnerabilities in association with network assets of the communications network.

Computer System

Figure 7:
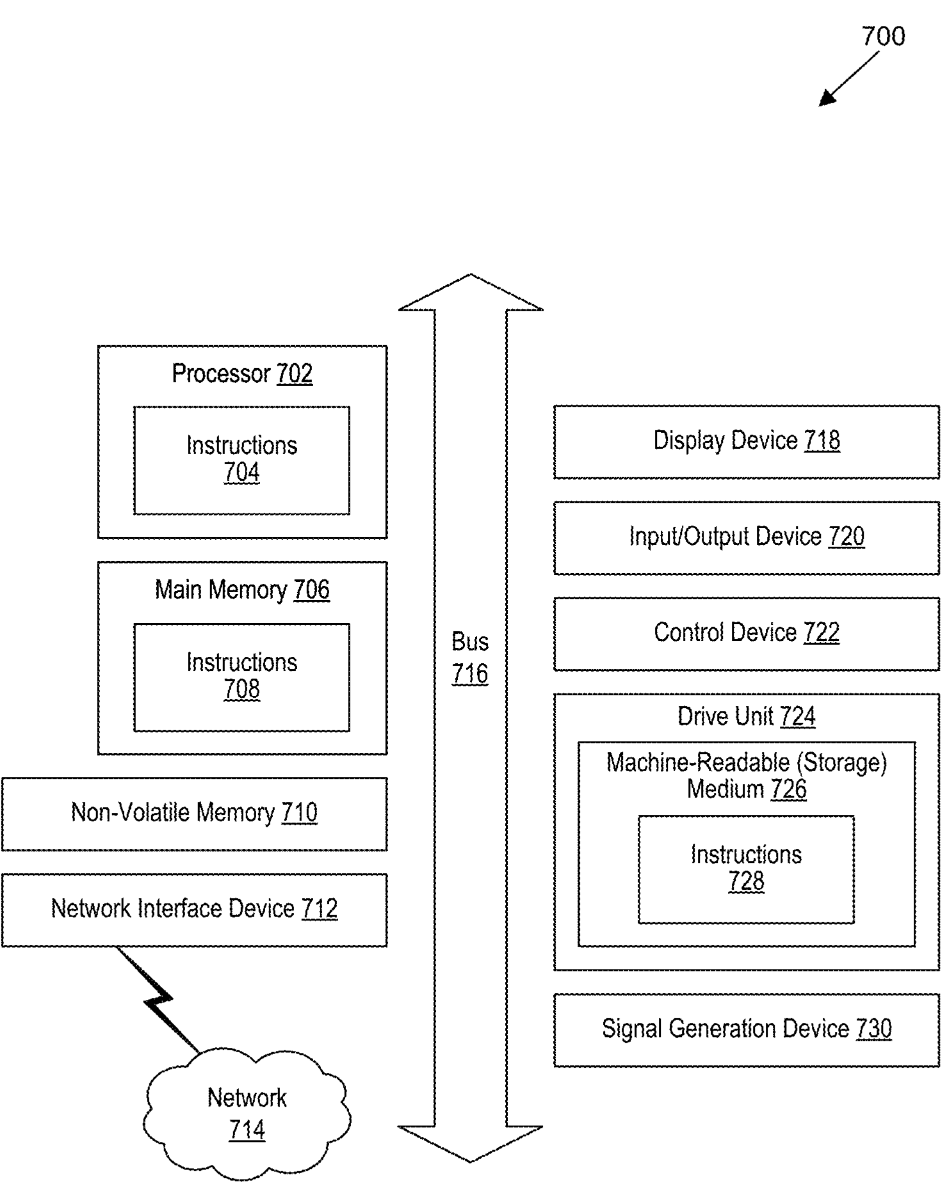
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example," "implementation," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A method for generating custom scanner agents for vulnerability management of a computer system, the method comprising:

collecting vulnerability information over a network from a publishing source, wherein the vulnerability information includes common vulnerabilities and exposures (CVEs) published on a public repository, and wherein the CVEs include a known vulnerability for a particular type of network asset;

collecting network asset information of a communications network, the communications network being subject to the vulnerability management, wherein the network asset information includes information about multiple types of network assets deployed in the communications network;

generating, using a generative artificial intelligence (AI) system, based on an input including the collected vulnerability information and the collected network asset information, a self-executing scanner agent configured to automatically scan the communications network for the known vulnerability;

deploying the scanner agent at any network assets of the communications network that match the particular type of network asset indicated in the collected vulnerability information;

in response to the scanner agent executing and detecting the known vulnerability in a particular network asset of the communications network, generating a record including an indication of the particular network asset in association with the known vulnerability; and storing the record in a data repository that aggregates records of detected known vulnerabilities in association with network assets of the communications network.

2. The method of claim 1 further comprising:

configuring a similarity parameter between the multiple types of network assets deployed in the communications network and the particular type of network asset;

configuring a first threshold for the similarity parameter that, when exceeded, associates the scanner agent with a network asset of the communications network; and configuring a second threshold for the scanner agent that, when exceeded, causes the scanner agent to self-execute scanning the network asset that exceeds the first threshold.

3. The method of claim 1, wherein the scanner agent is a first scanner agent and the particular type of network asset is a first type of network asset, the method further comprising:

calculating a correlation value between the known vulnerability and a second type of network asset of the communications network;

discovering a potential vulnerability for the second type of network asset based on the correlation value;

generating a second scanner agent configured to self-execute scanning of the communications network for the potential vulnerability; and training the generative AI system based on the records aggregated at the data repository and the potential vulnerability.

4. The method of claim 3, wherein calculating the correlation value comprises:

calculating a similarity score between the first type of network asset and the second type of network asset; or calculating a relevance score for the second type of network asset relative to the known vulnerability; and identifying the potential vulnerability based on the similarity score or the relevance score.

5. The method of claim 1, wherein the publishing source comprises:

a public national vulnerability database (NVD) that obtains the vulnerability information from a vendor of the particular type of network asset; or a vendor of the particular type of network asset and the vulnerability information is obtained directly from the vendor.

6. The method of claim 5, wherein the publishing source comprises a vendor of the particular type of network asset, and collecting the vulnerability information comprises:

automatically obtaining vulnerability information periodically from a website administered by the vendor.

7. The method of claim 1, wherein the particular network asset is a software asset, the method further comprising:

deploying a software patch for the software asset to remove a risk of the known vulnerability.

8. The method of claim 1 further comprising:

estimating a financial risk of the known vulnerability to an operator of the communications network by performing a risk valuation of the known vulnerability on the particular network asset.

9. A vulnerability management system comprising:

at least one hardware processor; and at least one non-transitory memory storing instructions, which, when executed by the at least one hardware processor, cause the vulnerability management system to:

collect vulnerability information over a network from a publishing source, wherein the vulnerability information includes common vulnerabilities and exposures (CVEs) published on a public repository, and wherein the CVEs include a known vulnerability for a particular type of network asset;

collect network asset information of a communications network, the communications network being subject to the vulnerability management system, wherein the network asset information includes information about multiple types of network assets deployed in the communications network;

generate, using a generative artificial intelligence (AI) system, based on an input including the collected vulnerability information and the collected network asset information, a self-executing scanner agent configured to automatically scan the communications network for the known vulnerability;

deploy the scanner agent at any network assets of the communications network that match the particular type of network asset indicated in the collected vulnerability information;

in response to the scanner agent executing and detecting the known vulnerability in a particular network asset of the communications network, generate a record including an indication of the particular network asset in association with the known vulnerability; and store the record in a data repository that aggregates records of detected known vulnerabilities in association with network assets of the communications network.

10. The vulnerability management system of claim 9 further caused to:

configure a similarity parameter between the multiple types of network assets deployed in the communications network and the particular type of network asset;

configure a first threshold for the similarity parameter that, when exceeded, associates the scanner agent with a network asset of the communications network; and configure a second threshold for the scanner agent that, when exceeded, causes the scanner agent to self-execute scanning the network asset that exceeds the first threshold.

11. The vulnerability management system of claim 9, wherein the scanner agent is a first scanner agent and the particular type of network asset is a first type of network asset, the system further caused to:

calculate a correlation value between the known vulnerability and a second type of network asset of the communications network;

discover a potential vulnerability for the second type of network asset based on the correlation value;

generate a second scanner agent configured to self-execute scanning of the communications network for the potential vulnerability; and train the generative AI system based on the records aggregated at the data repository and the potential vulnerability.

12. The vulnerability management system of claim 11, wherein calculating the correlation value comprises causing the system to:

calculate a similarity score between the first type of network asset and the second type of network asset; or calculate a relevance score for the second type of network asset relative to the known vulnerability; and identify the potential vulnerability based on the similarity score or the relevance score.

13. The vulnerability management system of claim 9, wherein the publishing source comprises:

a public national vulnerability database (NVD) that obtains the vulnerability information from a vendor of the particular type of network asset; or a vendor of the particular type of network asset and the vulnerability information is obtained directly from the vendor.

14. The vulnerability management system of claim 13, wherein the publishing source comprises a vendor of the particular type of network asset, and collecting the vulnerability information comprises causing the system to:

automatically obtain vulnerability information periodically from a website administered by the vendor.

15. At least one non-transitory, computer-readable storage medium carrying instructions, which, when executed by a vulnerability management system, cause the vulnerability management system to perform operations for identifying a vulnerability of a computer asset, the operations comprising:

collecting vulnerability information over a network from a publishing source, wherein the vulnerability information includes common vulnerabilities and exposures (CVEs) published on a public repository, and wherein the CVEs include a known vulnerability for a particular type of network asset;

collecting network asset information of a communications network, the communications network being subject to the vulnerability management system, wherein the network asset information includes information about multiple types of network assets deployed in the communications network;

generating, using a generative artificial intelligence (AI) system, based on an input including the collected vulnerability information and the collected network asset information, a self-executing scanner agent configured to automatically scan the communications network for the known vulnerability;

deploying the scanner agent at any network assets of the communications network that match the particular type of network asset indicated in the collected vulnerability information;

in response to the scanner agent executing and detecting the known vulnerability in a particular network asset of the communications network, generating a record including an indication of the particular network asset in association with the known vulnerability; and storing the record in a data repository that aggregates records of detected known vulnerabilities in association with network assets of the communications network.

16. The non-transitory, computer-readable storage medium of claim 15, wherein the system is further caused to:

configure a similarity parameter between the multiple types of network assets deployed in the communications network and the particular type of network asset;

configure a first threshold for the similarity parameter that, when exceeded, associates the scanner agent with a network asset of the communications network; and configure a second threshold for the scanner agent that, when exceeded, causes the scanner agent to self-execute scanning the network asset that exceeds the first threshold.

17. The non-transitory, computer-readable storage medium of claim 15, wherein the scanner agent is a first scanner agent and the particular type of network asset is a first type of network asset, the system further caused to:

calculate a correlation value between the known vulnerability and a second type of network asset of the communications network;

discover a potential vulnerability for the second type of network asset based on the correlation value;

generate a second scanner agent configured to self-execute scanning of the communications network for the potential vulnerability; and train the generative AI system based on the records aggregated at the data repository and the potential vulnerability.

18. The non-transitory, computer-readable storage medium of claim 17, wherein calculating the correlation value comprises causing the system to:

calculate a similarity score between the first type of network asset and the second type of network asset; or calculate a relevance score for the second type of network asset relative to the known vulnerability; and identify the potential vulnerability based on the similarity score or the relevance score.

19. The non-transitory, computer-readable storage medium of claim 15, wherein the particular network asset is a software asset, the system further caused to:

deploy a software patch for the software asset to remove a risk of the known vulnerability.

20. The non-transitory, computer-readable storage medium of claim 15, wherein the system is further caused to:

estimate a financial risk of the known vulnerability to an operator of the communications network by performing a risk valuation of the known vulnerability on the particular network asset.

* * * * *